(No Model.)
J. RICHARDS.
STOP VALVE.
No. 358,222. Patented Feb. 22, 1887.
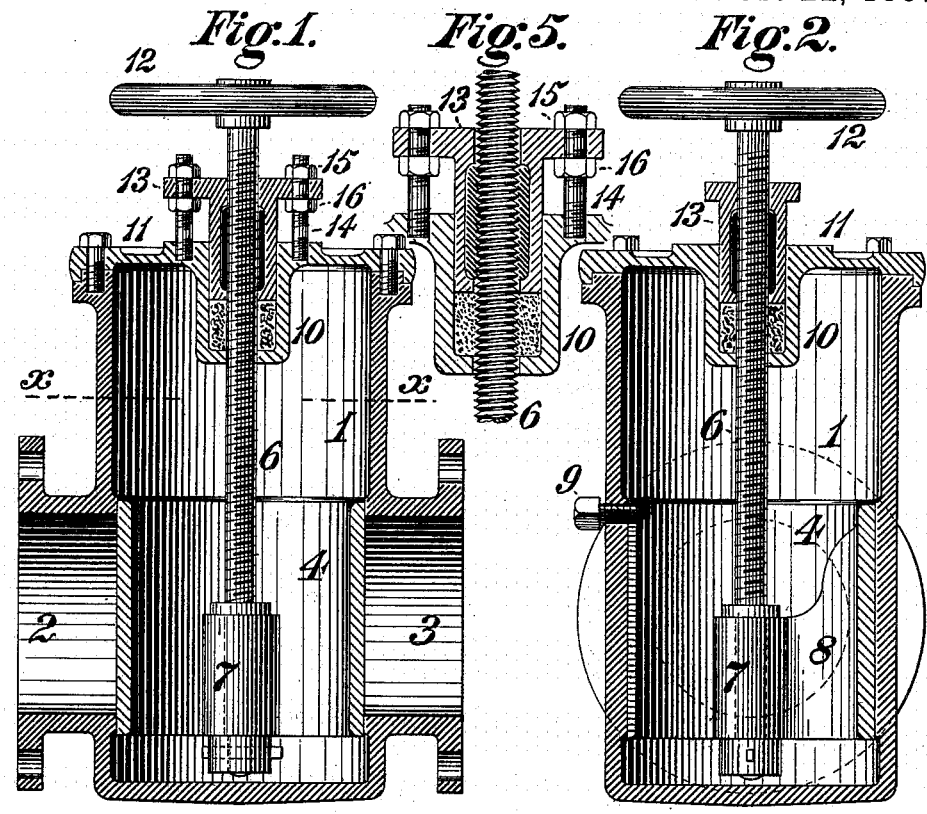
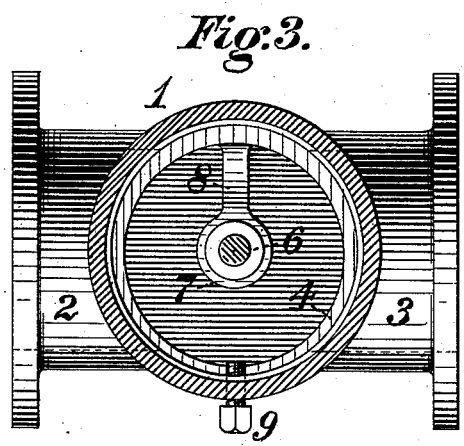
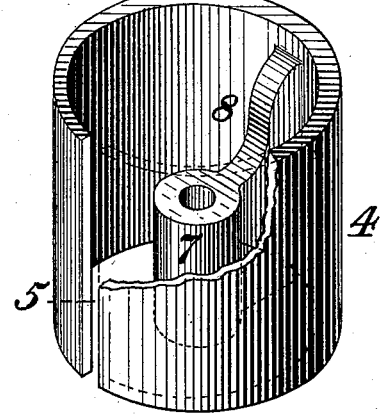
WITNESSES:
INVENTOR,

UNITED STATES PATENT OFFICE.

JOHN RICHARDS, OF SAN FRANCISCO, CALIFORNIA.

STOP-VALVE.

SPECIFICATION forming part of Letters Patent No. 358,222, dated February 22, 1887.

Application filed July 9, 1886. Serial No. 207,550. (No model.)

*To all whom it may concern:*

Be it known that I, JOHN RICHARDS, residing at San Francisco, in the county of San Francisco and State of California, a citizen of the United States, have invented or discovered certain new and useful Improvements in Stop-Valves, of which improvements the following is a specification.

In the accompanying drawings, which make part of this specification, Figure 1 is a longitudinal central section through a stop-valve and chamber embodying my invention; Fig. 2, a transverse central section through the same; Fig. 3, a horizontal section at the line $x$ $x$ of Fig. 1; Fig. 4, a view in perspective of the valve detached, and Fig. 5 a central section on an enlarged scale through the gland and a portion of the cap.

My invention relates to stop-valves of the full or open-way type, and its object is to provide a valve of such character which shall be simple and inexpensive in construction, effective in operation, and susceptible of ready renewal or repair of its parts when required; to which end my invention, generally stated, consists in the combination of a valve-case, a gate fixed upon a threaded stem working thereon, and an internally-threaded packing-gland engaging the valve-stem and acting to compress the packing thereof; also, in the combination, with an internally-threaded packing-gland which acts as a nut for a threaded valve-stem, of clamping-bolts connecting said gland to the valve-chamber and nuts engaging said bolts on opposite sides of the gland, so that proper compression may be exerted upon the packing without subjecting the same to pressure exerted through the gate and valve-stem.

The improvements claimed are hereinafter fully set forth.

In the practice of my invention I provide a cylindrical valve chamber or casing, 1, which is provided on opposite sides with supply and delivery nozzles or passages 2 3, the outer ends of which are suitably flanged or otherwise adapted for connection to pipes or receptacles for conveying or containing fluids. A tubular cylindrical gate or stop, 4, which is rendered flexible by being longitudinally split or divided by a lateral opening, 5, extending throughout its length, is fitted truly in the casing 1, with the capacity of longitudinal movement therein, said gate, when in the position shown in the drawings, cutting off communication between the nozzles or passages 2 3, and when raised above the same admitting of the clear and unobstructed passage of fluid from one to the other. The inner and outer surfaces of the gate 4 are eccentric one to the other, their radius of eccentricity being located in or about in line with the center of the passage 5, by which the gate is divided, thereby so disposing the metal of the gate that its greatest thickness shall be diametrically opposite said passage, and causing the gate under expansion or contraction to retain a truly cylindrical external form, and thus closely and accurately fit within its seat in the chamber 1.

Longitudinal movement in either direction is imparted to the gate 4 through a screw-threaded valve-stem, 6, secured to a central hub or boss, 7, which is connected by a radial rib or plate, 8, with the valve on the side opposite its dividing-passage 5, the valve-stem being provided on its outer end with a hand-wheel, 12, and rotation of the gate is prevented by a pin or set-screw, 9, fixed in the casing 1, and having its inner end projecting into the passage 5. The valve-stem 6 passes freely through a stuffing-box, 10, which is formed in or fixed centrally to a cap or cover, 11, closing the end of the valve-casing farthest from the passages 2 3, and is adapted to contain suitable packing for preventing leakage around the valve-stem, and the screw-thread of the stem engages a corresponding internal thread in a packing-gland, 13, which serves both as a nut for the valve-stem and as a gland for properly compressing the packing in the stuffing-box.

The gland 13 is connected to the cap 11 of the valve-casing 1 by clamping bolts or studs 14, fixed in the cap and passing freely through the gland, said bolts being provided with clamping-nuts 15 on the outside of the gland for compressing the packing and bearing-nuts 16 on its inner side, said bearing-nuts receiving the strain induced in opening the gate and preventing the same from being exerted upon the packing and imposing upon it a pressure greater than that which is required to prevent leakage of fluid from the casing around the stem and gland.

My improvements effect a material simplification in the construction and cost of the valve as compared with those heretofore ordinarily used, and provide a valve which by its accurate correspondence with its seat maintains its tightness under varying conditions of temperature and consequent expansion and contraction. The employment of the threaded gland enables the ordinary external nut to be dispensed with, correspondingly reducing the length of the valve-stem and the cost of material and workmanship in the complete device.

I claim as my invention and desire to secure by Letters Patent—

1. In a stop-valve, the combination of a chamber or casing, a longitudinally-divided tubular cylindrical gate or stop, a screw-threaded valve-stem secured to said gate, and an internally-threaded packing-gland fitting in a stuffing-box in the casing and engaging the valve-stem, substantially as set forth.

2. In a stop-valve, the combination of a chamber or casing, a longitudinally-divided tubular cylindrical gate or stop, a screw-threaded valve-stem secured to said gate, an internally-threaded packing-gland fitting in a stuffing-box in the casing and engaging the valve-stem, and clamping bolts or studs fixed in the casing and passing freely through the gland, said bolts being provided with clamping-nuts on the outside of the gland for compressing the packing, and bearing-nuts on the inside of the gland for receiving the thrust of the valve, substantially as set forth.

In testimony whereof I have hereunto set my hand.

JOHN RICHARDS.

Witnesses:
J. LINCOLN RALPH,
DARWIN S. WOLCOTT.